(12) United States Patent
Franklin

(10) Patent No.: US 9,003,535 B1
(45) Date of Patent: Apr. 7, 2015

(54) SYSTEMS AND METHODS FOR CERTIFYING CLIENT-SIDE SECURITY FOR INTERNET SITES

(75) Inventor: Jason Franklin, San Francisco, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 13/543,764

(22) Filed: Jul. 6, 2012

(51) Int. Cl.
*H04L 29/06* (2006.01)

(52) U.S. Cl.
CPC ............................. *H04L 29/06904* (2013.01)

(58) Field of Classification Search
CPC ..... H04L 63/1433; H04L 9/32; G06F 21/577; G06F 2221/034
See application file for complete search history.

(56) References Cited

U.S. PATENT DOCUMENTS

| | | | | |
|---|---|---|---|---|
| 2006/0195588 | A1* | 8/2006 | Pennington et al. | 709/227 |
| 2007/0061734 | A1* | 3/2007 | Abdulhayoglu | 715/742 |
| 2009/0138937 | A1* | 5/2009 | Erlingsson et al. | 726/1 |
| 2009/0271842 | A1* | 10/2009 | Baumhof | 726/1 |
| 2012/0324551 | A1* | 12/2012 | Bretschneider et al. | 726/5 |

OTHER PUBLICATIONS

Truste; The EU Cookie Directive is Now Being Enforced in the UK. Are You Ready?; www.truste.com, as accessed on Mar. 5, 2012.
Trust Guard; What is Trust Guard?; www.trust-guard.com, as accessed on Mar. 5, 2012.
Sitelock; Protect Your Site With SiteLock; www.sitelock.com, as accessed on Mar. 5, 2012.
Geotrust; SSL Certificates from a Leading SSL Certificate Authority; www.geotrust.com, as accessed on Mar. 5, 2012.
Comodo Group, Inc.; SSL Certificates Comodo Secure SSL Certificate Authority; www.comodo.com, as accessed on Mar. 5, 2012.
McAfee; McAfee Secure; www.mcafeesecure.com, as accessed on Mar. 5, 2012.

\* cited by examiner

*Primary Examiner* — Izunna Okeke
(74) *Attorney, Agent, or Firm* — ALG Intellectual Property, LLC

(57) ABSTRACT

A computer-implemented method for certifying client-side security for Internet sites may include 1) identifying an Internet site that is subject to a security evaluation, 2) retrieving at least one resource from the Internet site, 3) parsing the resource to determine that the resource includes at least one client-side security policy for an Internet client to enforce on the Internet site, and 4) certifying the Internet site as providing client-side security based on determining that the resource includes the client-side security policy. Various other methods, systems, and computer-readable media are also disclosed.

20 Claims, 7 Drawing Sheets

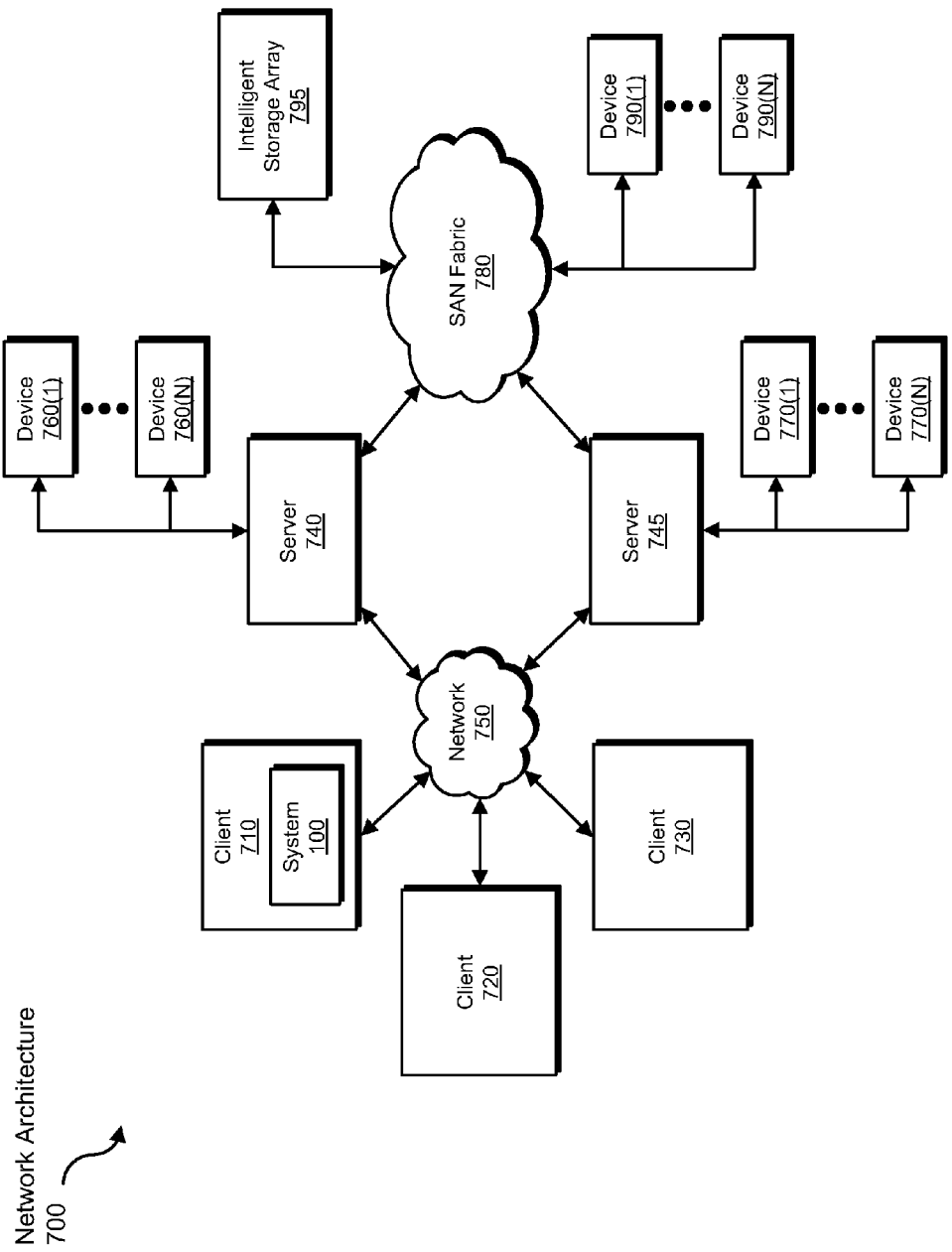

SYSTEMS AND METHODS FOR CERTIFYING CLIENT-SIDE SECURITY FOR INTERNET SITES

BACKGROUND

People increasingly rely on the Internet for business and personal use. Unfortunately, the Internet has become a major vector for data theft, malware, and other information security vulnerabilities. While Internet users may reduce the risk of attacks on their computing devices and/or data by only visiting reputable Internet sites, in some cases attackers may compromise these normally reputable Internet sites. With the proliferation of Internet sites and services, distinguishing secure Internet sites from insecure Internet sites may become impractical for most users and organizations. This may interfere with the legitimate use of the Internet by end users and/or by providers of Internet sites and services who rely on the trust of end users.

Some security vendors have sought to help users distinguish between trustworthy Internet sites and untrustworthy Internet sites with the use of trust seals. Trust seals may be displayed by Internet sites in order to increase user confidence in the security of the Internet site. These trust seals may convey the existence of security protections and imply that an Internet site is trustworthy. In order to receive a trust seal, an Internet site may pass a variety of security checks performed by a security vendor. For example, a security vendor may check an Internet site for server-side vulnerabilities and security measures and/or network security vulnerabilities and security measures. Unfortunately, traditional trust seals may not guarantee against increasingly common and important Internet threats. Accordingly, the instant disclosure identifies and addresses a need for systems and methods for certifying client-side security for Internet sites.

SUMMARY

As will be described in greater detail below, the instant disclosure generally relates to systems and methods for certifying client-side security for Internet sites by checking one or more resources available from an Internet site for associated client-side security policies for an Internet client to enforce and certifying the Internet site (e.g., with a trust seal indicating client-side security and/or comprehensive security). In one example, a computer-implemented method for certifying client-side security for Internet sites may include 1) identifying an Internet site that is subject to a security evaluation, 2) retrieving at least one resource from the Internet site, 3) parsing the resource to determine that the resource includes at least one client-side security policy for an Internet client to enforce on the Internet site, and 4) certifying the Internet site as providing client-side security based on determining that the resource includes the client-side security policy.

In some examples, retrieving the resource from the Internet site may include 1) sampling a plurality of resource from the Internet site and/or 2) retrieving all resources from the Internet site. In one example, retrieving the resource from the Internet site may include 1) identifying dummy account information for the Internet site and 2) logging into the Internet site using the dummy account information.

In some embodiments, parsing the resource to determine that the resource includes at least one client-side policy may include determining that the client-side security policy includes at least one whitelist defining at least one source from which the resource may load at least one additional resource. Additionally or alternatively, parsing the resource may include parsing a hypertext-transfer-protocol header of the resource for the client-side security policy.

In one example, certifying the Internet site may include providing a trust seal for display on the Internet site. In some examples, certifying the Internet site may include 1) determining that the Internet site provides network security, 2) determining that the Internet site provides server-side security, and 3) certifying the Internet site as providing end-to-end security.

In one embodiment, a system for implementing the above-described method may include 1) an identification module programmed to identify an Internet site that is subject to a security evaluation, 2) a retrieval module programmed to retrieve at least one resource from the Internet site, 3) a parsing module programmed to parse the resource to determine that the resource includes at least one client-side security policy for an Internet client to enforce on the Internet site, and 4) a certification module programmed to certify the Internet site as providing client-side security based on determining that the resource comprises the client-side security policy. The system may also include at least one processor configured to execute the identification module, the retrieval module, the parsing module, and the certification module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to 1) identify an Internet site that is subject to a security evaluation, 2) retrieve at least one resource from the Internet site, 3) parse the resource to determine that the resource includes at least one client-side security policy for an Internet client to enforce on the Internet site, and 4) certify the Internet site as providing client-side security based on determining that the resource includes the client-side security policy.

As will be explained in greater detail below, by checking one or more resources available from an Internet site for associated client-side security policies for an Internet client to enforce and then certifying the Internet site as providing client-side security, the systems and methods described herein may provide trust information useful for users of Internet sites such that users may have confidence to interact with the Internet sites. For example, these systems and methods may enable Internet sites to provide security vendor assurances to end users of end-to-end security in interactions with the Internet sites, including client-side security protection.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 7 is a block diagram of an exemplary computing network capable of implementing one or more of the embodiments described and/or illustrated herein.

Figure 1:
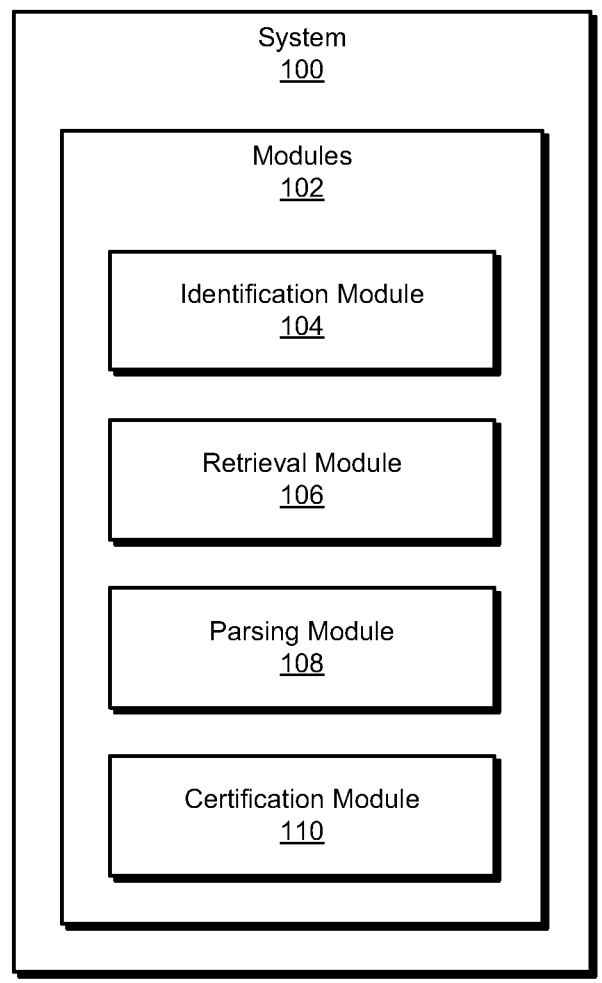
FIG. 1 is a block diagram of an exemplary system for certifying client-side security for Internet sites.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
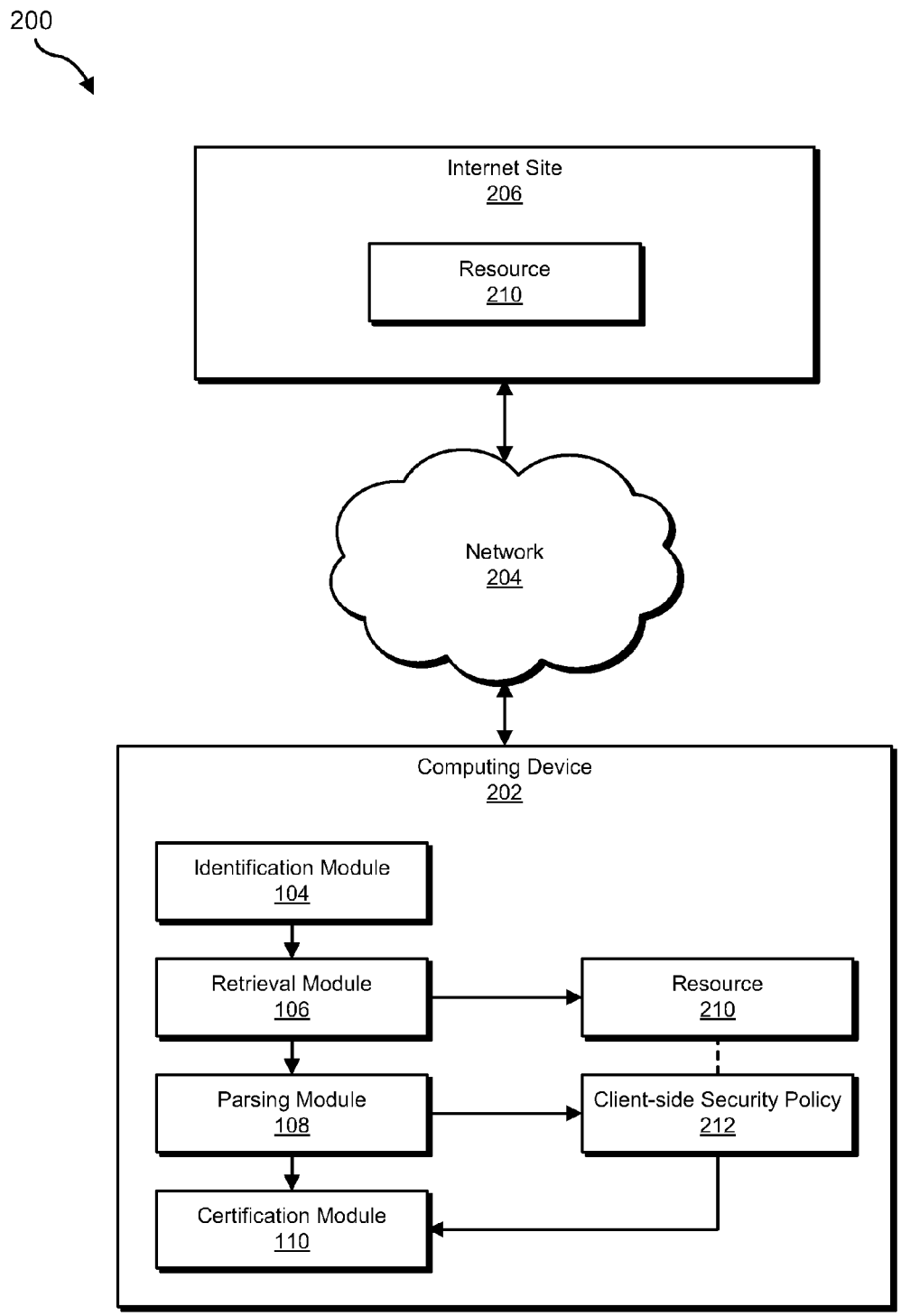
FIG. 2 is a block diagram of an exemplary system for certifying client-side security for Internet sites.
Figure 3:
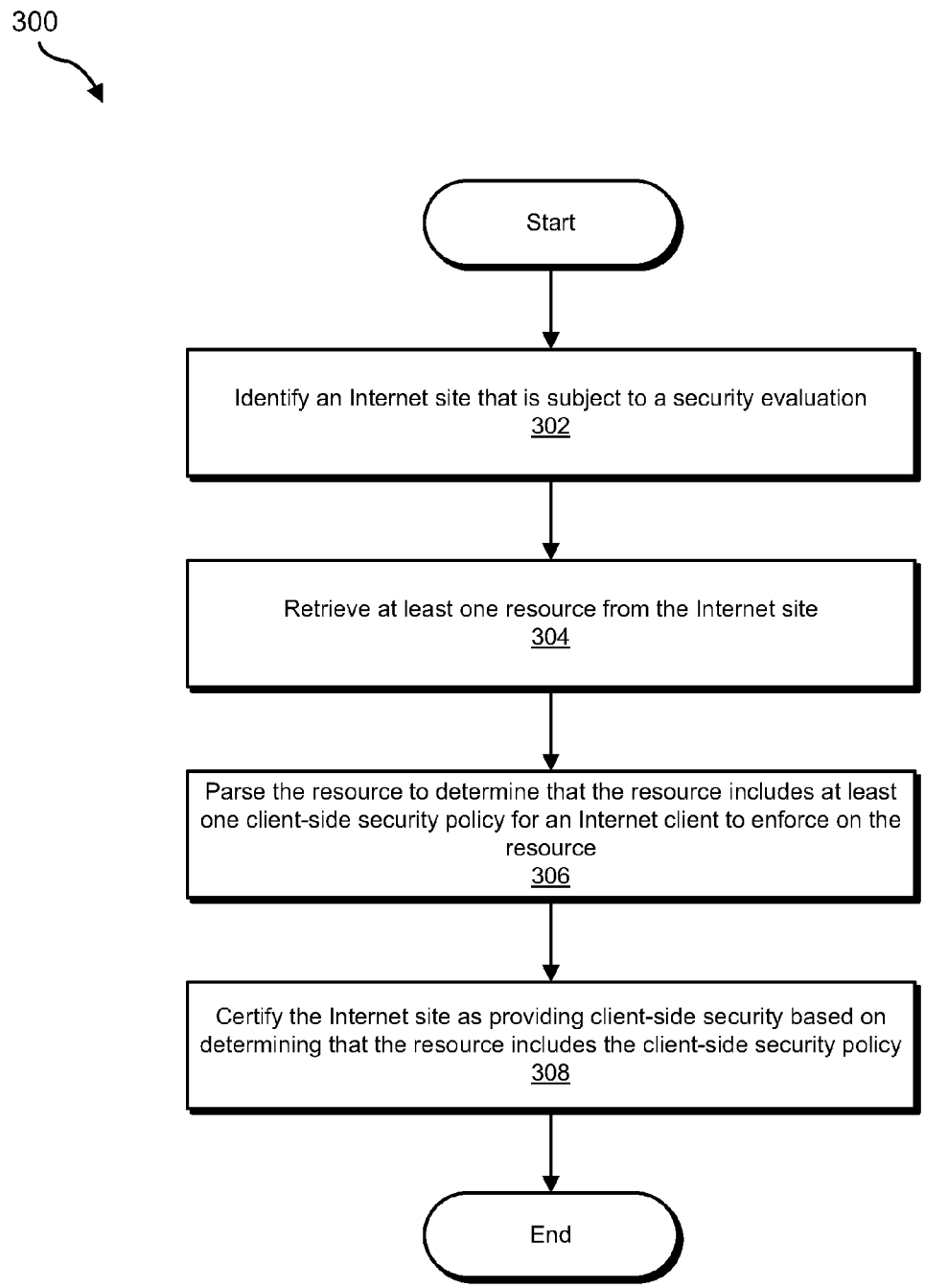
FIG. 3 is a flow diagram of an exemplary method for certifying client-side security for Internet sites.
Figure 4:
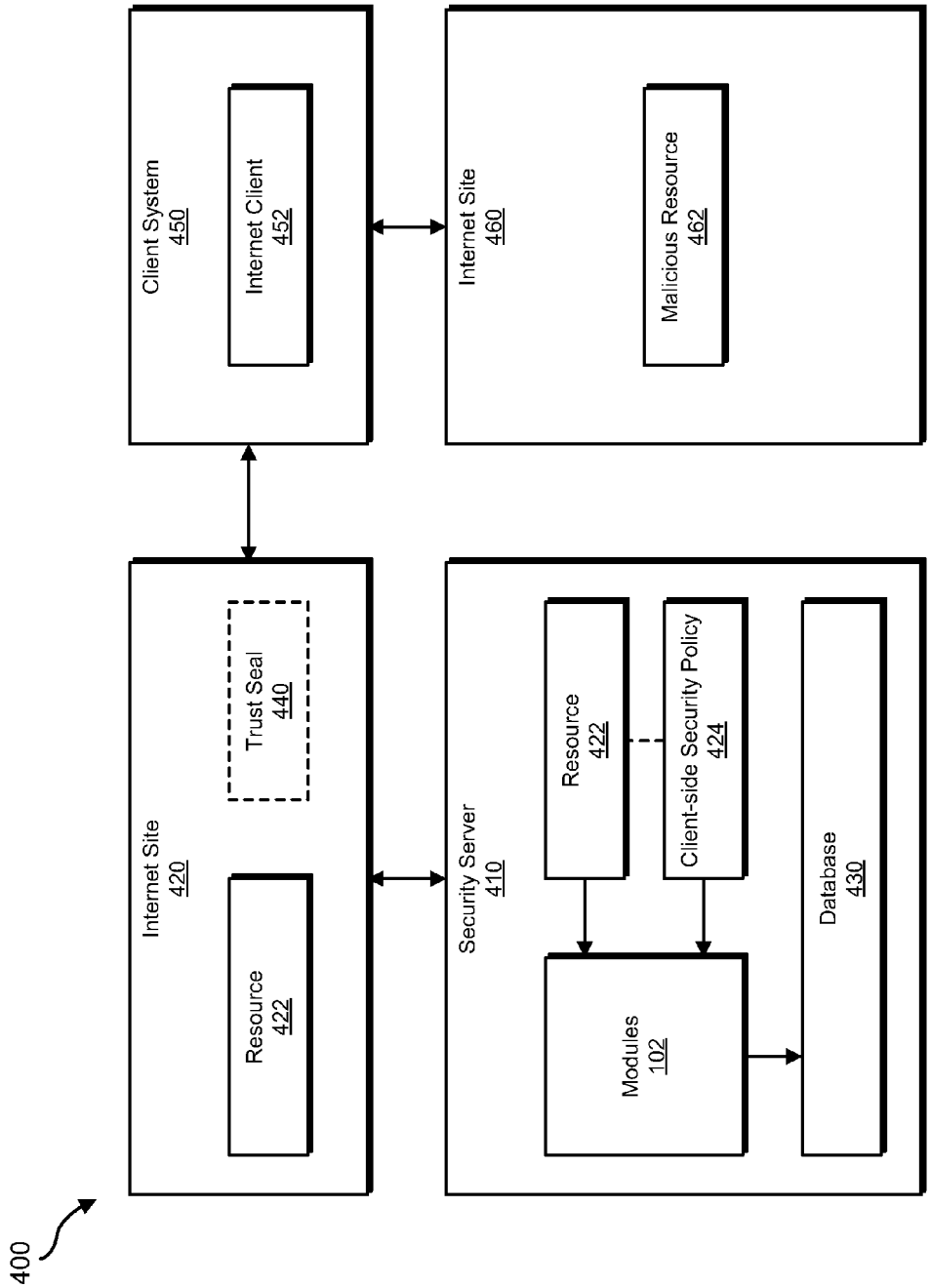
FIG. 4 is a block diagram of an exemplary system for certifying client-side security for Internet sites.

The following will provide, with reference to FIGS. 1, 2, and 4, detailed descriptions of exemplary systems for certifying client-side security for Internet sites. Detailed descriptions of corresponding computer-implemented methods will also be provided in connection with FIG. 3. Detailed descriptions of an exemplary Internet client will be provided in connection with FIG. 5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for certifying client-side security for Internet sites. As illustrated in this figure, exemplary system 100 may include one or more modules 102 for performing one or more tasks. For example, and as will be explained in greater detail below, exemplary system 100 may include an identification module 104 programmed to identify an Internet site that is subject to a security evaluation. Exemplary system 100 may also include a retrieval module 106 programmed to retrieve at least one resource from the Internet site.

In addition, and as will be described in greater detail below, exemplary system 100 may include a parsing module 108 programmed to parse the resource to determine that the resource includes at least one client-side security policy for an Internet client to enforce on the Internet site. Exemplary system 100 may also include a certification module 110 programmed to certify the Internet site as providing client-side security based on determining that the resource comprises the client-side security policy. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or Internet site 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with an Internet site 206 via a network 204 (e.g., in order to gather security information about Internet site 206).

In one embodiment, one or more of modules 102 from FIG. 1 may, when executed by at least one processor of computing device 202, facilitate computing device 202 in certifying client-side security for Internet sites. For example, and as will be described in greater detail below, one or more of modules 102 may cause computing device 202 to 1) identify an Internet site 206 that is subject to a security evaluation, 2) retrieve a resource 210 from Internet site 206, 3) parse resource 210 to determine that resource 210 includes a client-side security policy 212 for an Internet client to enforce on Internet site 206, and 4) certify Internet site 206 as providing client-side security based on determining that resource 210 includes client-side security policy 212.

Computing device 202 generally represents any type or form of computing device capable of reading computer-executable instructions. Examples of computing device 202 include, without limitation, desktops, servers, laptops, tablets, cellular phones, personal digital assistants (PDAs), multimedia players, embedded systems, combinations of one or more of the same, exemplary computing system 610 in FIG. 6, or any other suitable computing device. In some examples, computing device 202 may include a security vendor server configured to evaluate the security of one or more Internet sites.

Internet site 206 generally represents any type or form of computing device that is capable of hosting, relaying, and/or providing one or more resources. Examples of Internet site 206 include, without limitation, application servers and database servers configured to provide various database services and/or run certain software applications.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 700 in FIG. 7, or the like. Network 204 may facilitate communication or data transfer using wireless or wired connections. In one embodiment, network 204 may facilitate communication between computing device 202 and Internet site 206.

FIG. 3 is a flow diagram of an exemplary computer-implemented method 300 for certifying client-side security for Internet sites. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may identify an Internet site that is subject to a security evaluation. For example, at step 302 identification module 104 may, as part of computing device 202 in FIG. 2, identify Internet site 206 that is subject to a security evaluation.

As used herein, the phrase "Internet site" one or more associated devices, documents, and/or resources. For example, an Internet site may include a web site. In some examples, the Internet site may include a single resource (e.g., a single web page). Additionally or alternatively, the Internet site may include a collection of resources (e.g., multiple web pages organized under a single Internet domain and/or address.

As used herein, the term "security evaluation" may refer to any evaluation for identifying one or more security and/or privacy protections, policies, and/or vulnerabilities within an Internet site. In some examples, the security evaluation may evaluate the Internet site in relation to one or more specified Internet clients (e.g., specific web browsers). In some examples, the security evaluation may evaluate the Internet site for client-side protection against one or more attacks. For example, the security evaluation may evaluate the Internet site for client-side protection against a cross-site scripting attack, a cross-site request forgery, and/or a clickjacking attack. As used herein, the phrase "cross-site scripting attack" may refer to any attack whereby an attacker may inject a client-side script into an otherwise legitimate resource (e.g., a web page). As used herein, the phrase "cross-site request forgery" may include any attack whereby an attacker may cause a client to transmit an unauthorized request to an Internet site. As used herein, the phrase "clickjacking attack" may refer to any attack whereby an attacker may place an obfuscated input element on an Internet site in order to induce a user to unintentionally perform a function specified by the input element.

Identification module 104 may identify the Internet site in any of a variety of ways. In some examples, identification module 104 may identify the Internet site within a list, database, and/or stream of Internet sites to evaluate. For example, identification module 104 may identify the Internet site as an Internet site that has requested certification from a security vendor. Additionally or alternatively, identification module 104 may identify the Internet site while crawling the Internet (e.g., for popular sites, sites of interest, sites requiring trust from users based on one or more interactions available for users of the sites, etc.).

In some examples, identification module 104 may operate as a part of a security vendor server. Additionally or alternatively, the identification module 104 may operate as a part of a client system. In this example, identification module 104 may identify the Internet site by identifying an Internet site that an Internet client has attempted to access, by identifying a link to an Internet site embedded in a resource loaded by the Internet client, by identifying a bookmark to the Internet site in the Internet client, and/or by identifying the Internet site in a history of the Internet client.

FIG. 4 illustrates an exemplary system 400 for certifying client-side security for Internet sites. As shown in FIG. 4, exemplary system 400 may include a security server 410, an Internet site 420, and a client system 450. Using FIG. 4 as an example, identification module 104 may, as a part of security server 410, identify Internet site 420 as subject to a security evaluation.

Returning to FIG. 3, at step 304 one or more of the systems described herein may retrieve at least one resource from the Internet site. For example, at step 304 retrieval module 106 may, as part of computing device 202 in FIG. 2, retrieve resource 210 from Internet site 206.

As used herein, the term "resource" may refer to any document and/or data provided by the Internet site. For example, the term "resource" may refer to a web page (e.g., a hypertext document). In some examples, the term "resource" may refer to a response served by the Internet site (e.g., a hypertext transfer protocol response). In some examples, the resource may include a static resource (e.g., a resource stored as a part of the Internet site). Additionally or alternatively, the resource may include a dynamic resource (e.g., generated upon request according to one or more parameters).

In some examples, retrieval module 106 may retrieve a single resource from the Internet site. Additionally or alternatively, retrieval module 106 may retrieve multiple resources from the Internet site. For example, retrieval module 106 may sample a plurality of resources from the Internet site. In this example, retrieval module 106 may sample sufficient resources to provide a representative group of resources from the Internet site according to a predetermined metric. For example, retrieval module 106 may retrieve a predetermined percentage of resources from the Internet site. Additionally or alternatively, retrieval module 106 may retrieve all resources that meet a threshold for an importance metric (e.g., based on the prominence of the resource within the Internet site, etc.). In some examples, retrieval module 106 may retrieve all resources from the Internet site. Additionally or alternatively, retrieval module 106 may retrieve all available resource from the Internet site and/or all static resources from the Internet site.

In some examples, the Internet site may require one or more credentials to access one or more resources. In these examples, retrieval module 106 may identify dummy account information for the Internet site (e.g., an account belonging to a security vendor and/or provided by the Internet site for testing purposes). Retrieval module 106 may then log into the Internet site using the dummy account information. Accordingly, retrieval module 106 may retrieve the resource based on credentials associated with an active session.

Retrieval module 106 may operate as a part of a security vendor server. Additionally or alternatively, in some examples retrieval module 106 may operate as a part of an end-user client system. For example, retrieval module 106 may retrieve the resource once an Internet client attempts to access the resource. Additionally or alternatively, retrieval module 106 may retrieve the resource once the Internet client attempts to access another resource on the Internet site. In some examples, retrieval module 106 may retrieve the resource after identifying the Internet site via a link embedded in another resource loaded by the Internet client (e.g., in order to pre-fetch security information about the Internet site).

Using FIG. 4 as an example, retrieval module 106 may, as a part of security server 410, retrieve resource 422 from Internet site 420.

Returning to FIG. 3, at step 306 one or more of the systems described herein may parse the resource to determine that the resource includes at least one client-side security policy for an Internet client to enforce on the Internet site. For example, at step 306 parsing module 108 may, as part of computing device 202 in FIG. 2, parse resource 210 to determine that resource 210 includes client-side security policy 212 for an Internet client to enforce on Internet site 206.

As used herein, the phrase "client-side security policy" may refer to any policy, configuration, rule, and/or setting for implementing a client-side security and/or privacy measure. As will be explained in greater detail below, in some examples the client-side security policy may include a whitelist.

In some examples, parsing module 108 may determine that the resource includes the client-side security policy by determining that the resource includes one or more whitelists defining at least one source from which the resource may load at least one additional resource. For example, parsing module 108 may determine that the resource includes a whitelist of one or more sources from which scripts may be loaded (e.g., to execute in context of the resource in an Internet client). As another example, parsing module 108 may determine that the resource includes a whitelist of one or more sources from which images may be loaded.

Parsing module 108 may identify the client-side security policy in any of a variety of ways. For example, parsing module 108 may parse a hypertext-transfer-protocol header of the resource for the client-side security policy. In this example, parsing module 108 may identify one or more access control policy statements. In some examples, parsing module 108 may identify the client-side security policy in a separate message from the Internet site (e.g., outside a hypertext-transfer-protocol response).

In some examples, one or more of the systems described herein may identify the client-side security policy by receiving an identification of the client-side security policy from an Internet client. For example, a server for the Internet site may determine that the Internet client is using a secure protocol.

As mentioned earlier, in some examples one or more of the systems described herein may retrieve multiple resources from the Internet site for evaluating the Internet site. In these examples, each resource may include a corresponding client-side security policy, and parsing module 108 may confirm the existence of each client-side security policy for each resource.

Using FIG. 4 as an example, parsing module 108 may parse resource 422 (and/or a message containing and/or associated with the resource and sent by Internet site 420) to identify a client-side security policy 424. In some examples, client-side security policy 424 may exclude an Internet site 460 (e.g., by not including Internet site 460 on a whitelist) from acceptable sources from which Internet clients (e.g., an Internet client 452 on client system 450) may retrieve resources via resource 422. Accordingly, client-side security policy 424, when enforced, may prevent an attacker controlling Internet site 460 from causing malicious resource 462 to load on Internet client 452 when Internet client 452 loads resource 422 from Internet site 420. Upon identifying client-side security policy 424, parsing module 108 may update a database 430 to indicate that Internet site 420 provides client-side security.

Returning to FIG. 3, at step 308 one or more of the systems described herein may certify the Internet site as providing client-side security based on determining that the resource includes the client-side security policy. For example, at step 308 certification module 110 may, as part of computing device 202 in FIG. 2, certify Internet site 206 as providing client-side security based on determining that resource 210 includes client-side security policy 212.

Certification module 110 may certify the Internet site in any of a variety of ways. For example, certification module 110 may certify the Internet site by providing a trust seal for display on the Internet site. As used herein, the phrase "trust seal" may refer to any interface element and/or visual indicator that relates to and/or implies client-side security. For example, the trust seal may include a standard image used by a security vendor to certify to an end-user that an Internet site has met one or more security requirements. In some examples, the trust seal may be configured for display within one or more resources of the Internet site (e.g., on one or more web pages of the Internet site). Additionally or alternatively, the trust seal may be configured for display within an Internet client (e.g., a toolbar of a web browser).

In some examples, certification module 110 may determine that the Internet site provides security at one or more additional points and thereby determine to certify the Internet as providing a more comprehensive security that includes client-side security. For example, certification module 110 may 1) determine that the Internet site provides network security, 2) determine that the Internet site provides server-side security, and 3) certify the Internet site as providing end-to-end security. For example, certification module 110 may determine that the Internet site is free from one or more server-side vulnerabilities and that the Internet site uses a secure communication protocol. Accordingly, by certifying that the Internet site provides end-to-end security, certification module 110 may certify that the Internet site provides client-side security (e.g., to a standard defined by a security vendor).

Certification module 110 may operate as a part of a security vendor server. Additionally or alternatively, in some examples certification module 110 may operate as a part of an end-user client system. For example, certification module 110 may determine that an Internet client (e.g., in combination with information received from the Internet site) is configured for client-side security protections. In this example, certification module 110 may certify the Internet site as providing end-to-end security (e.g., in combination with information received about the Internet site indicating that the Internet site provides server-side security and network security).

Using FIG. 4 as an example, certification module 110 may, as a part of security server 410, certify Internet site 420 as providing client-side security. For example, certification module 110 may provide a trust seal 440 to Internet site 420 indicating client-side security and/or end-to-end security protection. In some examples, Internet site 420 may display trust seal 440 (e.g., when an Internet client 452 retrieves one or more resources from Internet site 420, such as resource 422).

Figure 5:
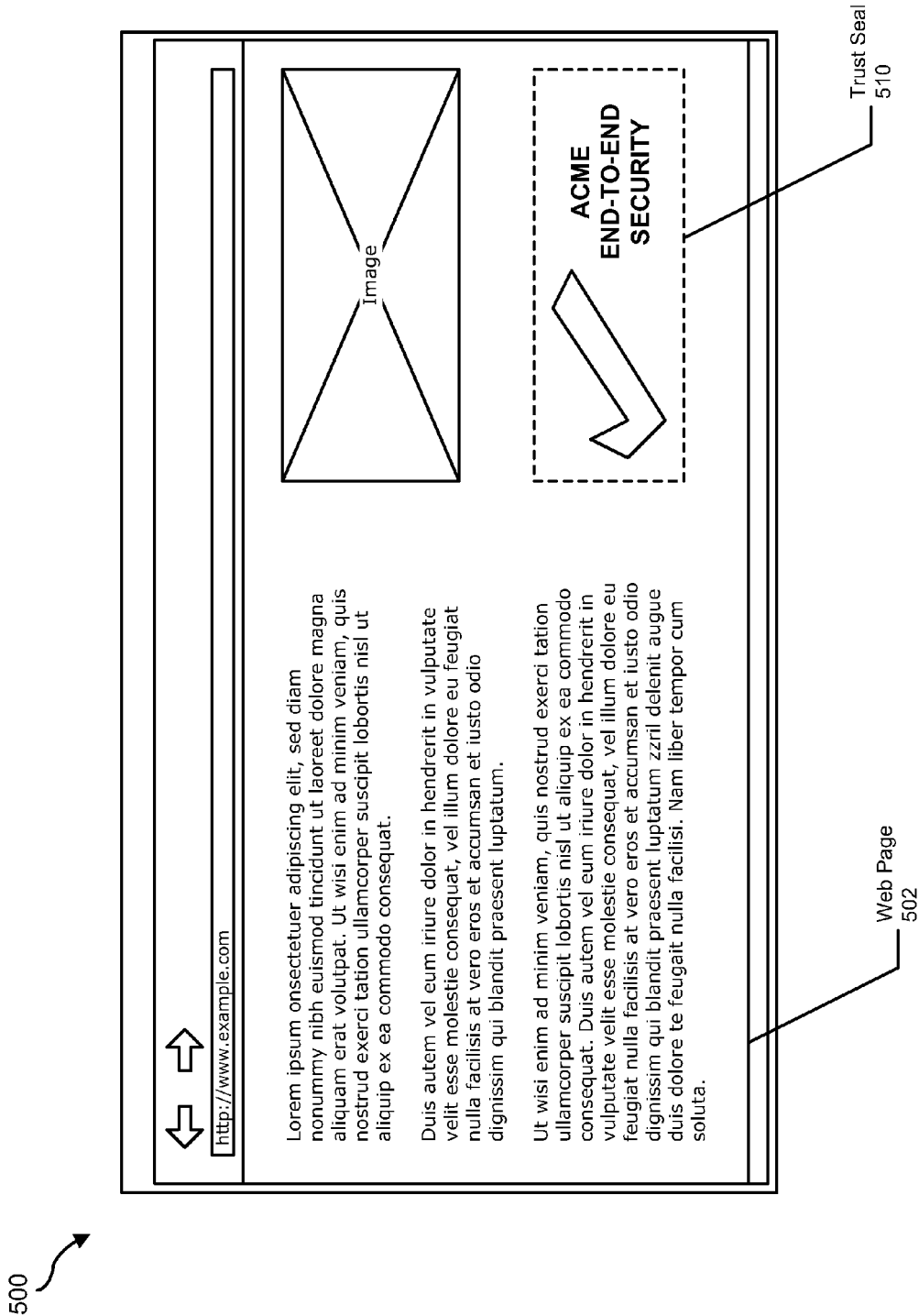
FIG. 5 is an illustration of an exemplary Internet client.

FIG. 5 illustrates an exemplary Internet client 500. As shown in FIG. 5, exemplary Internet client 500 may have loaded a web page 502. Web page 502 may include a trust seal 510 indicating end-to-end security. For example, trust seal 510 may indicate that web page 502 (and/or one or more additional web pages) meets an end-to-end security standard as defined by a security vendor that distributes trust seal 510. Accordingly, a user may interact with a web site of web page 502 with increased confidence against client-side attacks via the web site.

As explained above, by checking one or more resources available from an Internet site for associated client-side security policies for an Internet client to enforce and then certifying the Internet site as providing client-side security, the systems and methods described herein may provide trust information useful for users of Internet sites such that users may have confidence to interact with the Internet sites. For example, these systems and methods may enable Internet sites to provide security vendor assurances to end users of end-to-end security in interactions with the Internet sites, including client-side security protection.

Figure 6:
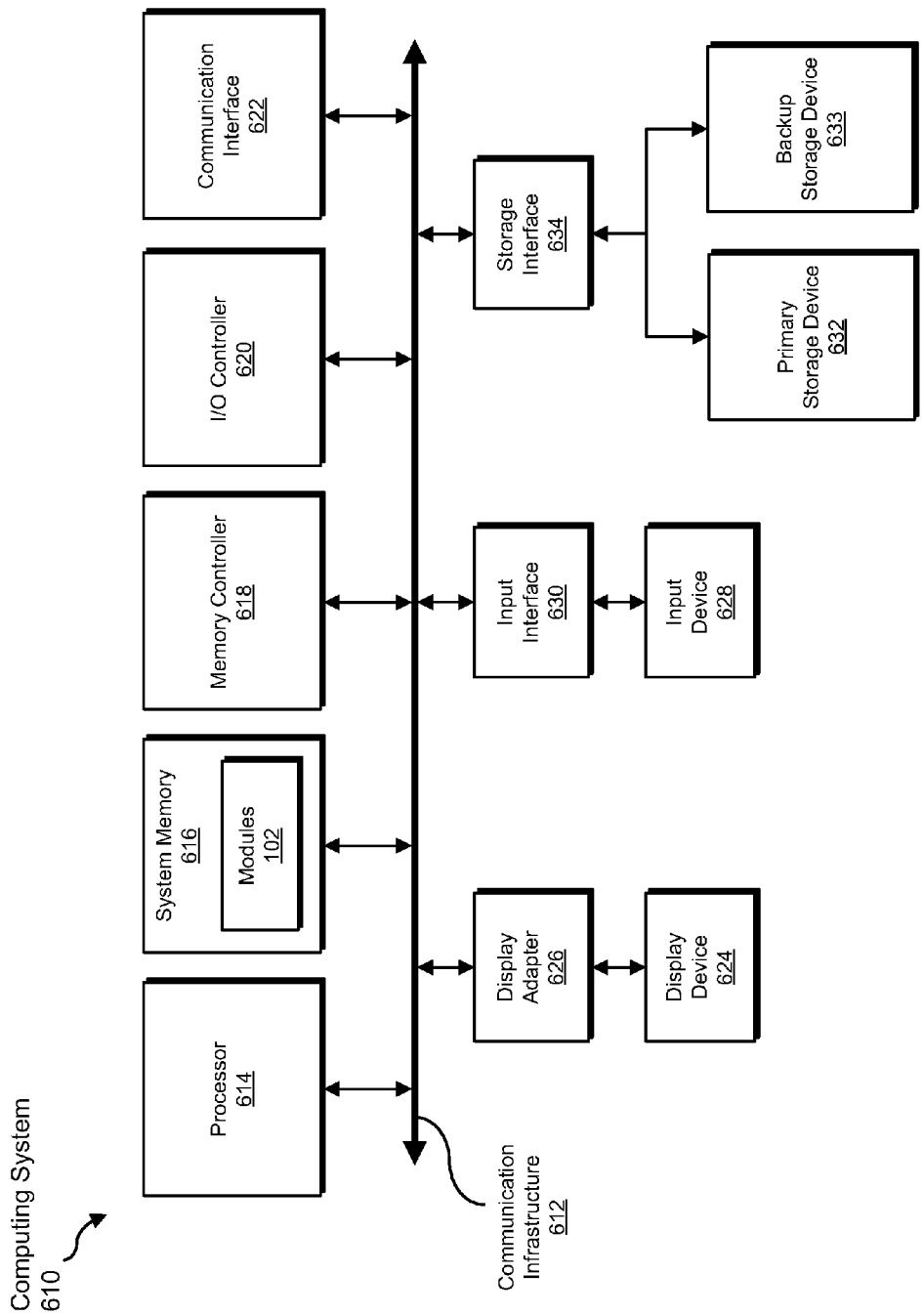
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the identifying, retrieving, parsing, determining, sampling, logging, providing, and certifying steps described herein. All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 610. All or a portion of the computer program stored on the computer-readable-storage medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the identifying, retrieving, parsing, determining, sampling, logging, providing, and certifying steps disclosed herein. All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for certifying client-side security for Internet sites.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a computing device into a device for certifying client-side security for Internet sites.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for certifying the security of Internet sites, at least a portion of the method being performed by a computing device comprising at least one processor, the method comprising:
    evaluating, via a security vendor server, the security of an Internet site by:
        retrieving a plurality of hypertext documents from the Internet site;
        checking the plurality of hypertext documents for client-side security policies configured to be enforced by a browser of a client attempting to access the Internet site, the checking comprising parsing respective headers of the plurality of hypertext documents to determine that each hypertext document within the plurality of hypertext documents comprises at least one client-side security policy that is configured to be enforced by a browser of a client attempting to access the Internet site;
    based on determining that each hypertext document within the plurality of hypertext documents comprises the client-side security policy that is configured to be enforced by a browser of a client attempting to access the Internet site, certifying, via the security vendor server, that the Internet site provides client-side security by providing a trust seal for display on the Internet site, wherein the trust seal certifies, to visitors of the Internet site, that the Internet site provides a client-side security policy for client-side Internet browsers to enforce.

2. The computer-implemented method of claim 1, wherein the plurality of hypertext documents comprises a representative group of hypertext documents from the Internet site according to a predetermined metric.

3. The computer-implemented method of claim 1, wherein certifying that the Internet site provides a client-side security policy for client-side Internet browsers to enforce comprises:
    determining that the Internet site provides network security;
    determining that the Internet site provides server-side security;
    certifying that the Internet site provides end-to-end security.

4. The computer-implemented method of claim 1, wherein parsing the respective headers of the plurality of hypertext documents to determine that each hypertext document within the plurality of hypertext documents comprises the client-side security policy that is configured to be enforced by a browser of a client attempting to access the Internet site comprises determining that the client-side security policy comprises at least one whitelist defining at least one source from which each hypertext document within the plurality of hypertext documents may load at least one additional resource.

5. The computer-implemented method of claim 4, wherein determining that the client-side security policy that is configured to be enforced by a browser of a client attempting to access the Internet site comprises at least one whitelist defining at least one source from which each hypertext document within the plurality of hypertext documents may load the additional resource comprises determining that the security policy comprises at least one whitelist of sources from which scripts may be loaded.

6. The computer-implemented method of claim 1, wherein evaluating the security of the Internet site comprises evaluating the security of the Internet site in response to the Internet site requesting certification from a security vendor associated with the security vendor server.

7. The computer-implemented method of claim 1, wherein checking the plurality of hypertext documents for client-side security policies configured to be enforced by a browser of a client attempting to access the Internet site comprises checking the plurality of hypertext documents for client-side security policies that protect against at least one of:
    a cross-site scripting attack;
    a cross-site request forgery;
    a clickjacking attack.

8. The computer-implemented method of claim 1, wherein retrieving the plurality of hypertext documents from the Internet site comprises:
- identifying dummy account information for the Internet site;
- logging into the Internet site using the dummy account information.

9. A system for certifying the security of Internet sites, the system comprising:
- an identification module programmed to identify an Internet site that is subject to a security evaluation and evaluate, via a security vendor server, the security of the Internet site;
- a retrieval module programmed to retrieve a plurality of hypertext documents from the Internet site;
- a parsing module programmed to check the plurality of hypertext documents for client-side security policies configured to be enforced by a browser of a client attempting to access the Internet site, the checking comprising parsing respective headers of the plurality of hypertext documents to determine that each hypertext document within the plurality of hypertext documents comprises at least one client-side security policy that is configured to be enforced by a browser of a client attempting to access;
- a certification module programmed to certify, via the security vendor server and based on determining that each hypertext document within the plurality of hypertext documents comprises the client-side security policy configured to be enforced by a browser of a client attempting to access the Internet site, that the Internet site provides client-side security by providing a trust seal for display on the Internet site, wherein the trust seal certifies, to visitors of the Internet site, that the Internet site provides a client-side security policy for client-side Internet browsers to enforce;
- at least one physical processor configured to execute the identification module, the retrieval module, the parsing module, and the certification module.

10. The system of claim 9, wherein the plurality of hypertext documents comprises a representative group of hypertext documents from the Internet site according to a predetermined metric.

11. The system of claim 9, wherein the security vendor server identifies the Internet site that is subject to the security evaluation while crawling the Internet.

12. The system of claim 9, wherein the parsing module is programmed to parse the respective headers of the plurality of hypertext documents to determine that each hypertext document within the plurality of hypertext documents comprises the client-side security policy that is configured to be enforced by a browser of a client attempting to access the Internet site by determining that the client-side security policy comprises at least one whitelist defining at least one source from which each hypertext document from within the plurality of hypertext documents may load at least one additional resource.

13. The system of claim 9, wherein the retrieval module is programmed to retrieve the plurality of hypertext documents from the Internet site by retrieving all hypertext documents from the Internet site.

14. The system of claim 9, wherein the identification module is programmed to identify the Internet site in response to the Internet site requesting certification from a security vendor associated with the security vendor server.

15. The system of claim 9, wherein the parsing module is programmed to check the plurality of hypertext documents for client-side security policies configured to be enforced by a browser of a client attempting to access the Internet site by checking the plurality of hypertext documents for client-side security policies that protect against at least one of:
- a cross-site scripting attack;
- a cross-site request forgery;
- a clickjacking attack.

16. The system of claim 9, wherein the retrieval module is programmed to retrieve the plurality of hypertext documents from the Internet site by:
- identifying dummy account information for the Internet site;
- logging into the Internet site using the dummy account information.

17. A non-transitory computer-readable-storage medium comprising one or more computer-executable instructions that, when executed by at least one processor of a computing device, cause the computing device to:
- evaluate, via a security vendor server, the security of an Internet site by:
  - retrieving a plurality of hypertext documents from the Internet site;
  - checking the plurality of hypertext documents for client-side security policies configured to be enforced by a browser of a client attempting to access the Internet site, the checking comprising parsing respective headers of the plurality of hypertext documents to determine that each hypertext document within the plurality of hypertext documents comprises at least one client-side security policy that is configured to be enforced by a browser of a client attempting to access the Internet site;
- certify, via the security vendor server and based on determining that each hypertext document within the plurality of hypertext documents comprises the client-side security policy configured to be enforced by a browser of a client attempting to access the Internet site, that the Internet site provides client-side security by providing a trust seal for display on the Internet site, wherein the trust seal certifies, to visitors of the Internet site, that the Internet site provides a client-side security policy for client-side Internet browsers to enforce.

18. The non-transitory computer-readable-storage medium of claim 17, wherein the trust seal is further configured for display within a toolbar of a web browser.

19. The non-transitory computer-readable-storage medium of claim 17, wherein the one or more computer-executable instructions cause the computing device to certify that the Internet site provides a client-side security policy for client-side Internet browsers to enforce by causing the computing device to:
- determine that the Internet site provides network security;
- determine that the Internet site provides server-side security;
- certify that the Internet site provides end-to-end security.

20. The non-transitory computer-readable-storage medium of claim 17, wherein the one or more computer-executable instructions cause the computing device to parse the respective headers of the plurality of hypertext documents to determine that each hypertext document within the plurality of hypertext documents comprises the client-side security policy configured to be enforced by a browser of a client attempting to access the Internet site by causing the computing device to determine that the client-side security policy comprises at least one whitelist defining at least one source from which each hypertext document within the plurality of hypertext documents may load at least one additional resource.

* * * * *

UNITED STATES PATENT AND TRADEMARK OFFICE
CERTIFICATE OF CORRECTION

| | | |
|---|---|---|
| PATENT NO. | : 9,003,535 B1 | Page 1 of 1 |
| APPLICATION NO. | : 13/543764 | |
| DATED | : April 7, 2015 | |
| INVENTOR(S) | : Franklin | |

It is certified that error appears in the above-identified patent and that said Letters Patent is hereby corrected as shown below:

In the claims

Claim 9, column 15, line 25, should read:
attempting to access the Internet site;

Signed and Sealed this
Twentieth Day of October, 2015

Michelle K. Lee
*Director of the United States Patent and Trademark Office*